(12) United States Patent
Schossmann et al.

(10) Patent No.: US 9,691,550 B2
(45) Date of Patent: Jun. 27, 2017

(54) MULTI-LAYER CAPACITOR AND METHOD FOR PRODUCING A MULTI-LAYER CAPACITOR

(71) Applicant: EPCOS AG, Munich (DE)

(72) Inventors: Michael Schossmann, Deutschlandsberg (AT); Günter Engel, Leibnitz (AT); Stefan Obermair, Stainz (AT); Bernhard Döllgast, Deutschlandsberg (AT); Markus Koini, Seiersberg (AT); Jürgen Konrad, Graz (AT)

(73) Assignee: EPCOS AG, Munich (DE)

( * ) Notice: Subject to any disclaimer, the term of this patent is extended or adjusted under 35 U.S.C. 154(b) by 62 days.

(21) Appl. No.: 14/441,467

(22) PCT Filed: Oct. 7, 2013

(86) PCT No.: PCT/EP2013/070820
§ 371 (c)(1),
(2) Date: May 7, 2015

(87) PCT Pub. No.: WO2014/075846
PCT Pub. Date: May 22, 2014

(65) Prior Publication Data
US 2015/0294792 A1 Oct. 15, 2015

(30) Foreign Application Priority Data
Nov. 15, 2012 (DE) .................. 10 2012 111 023

(51) Int. Cl.
*H01G 4/30* (2006.01)
*H01G 4/38* (2006.01)
(Continued)

(52) U.S. Cl.
CPC ............... *H01G 4/30* (2013.01); *B32B 7/045* (2013.01); *B32B 15/04* (2013.01); *B32B 37/0076* (2013.01); *B32B 37/18* (2013.01); *H01G 4/005* (2013.01); *H01G 4/1218* (2013.01); *H01G 4/385* (2013.01); *B32B 2307/202* (2013.01); *B32B 2307/204* (2013.01); *B32B 2311/00* (2013.01);
(Continued)

(58) Field of Classification Search
CPC ........... H01G 4/30; H01G 4/228; H01G 4/012
See application file for complete search history.

(56) References Cited

U.S. PATENT DOCUMENTS 3,721,871 A * 3/1973 Heron ............... H01G 4/30
361/275.1
4,903,166 A 2/1990 Galvagni
(Continued)

FOREIGN PATENT DOCUMENTS

CN 1187017 7/1998
CN 101276686 A 10/2008
(Continued)

*Primary Examiner* — Eric Thomas
(74) *Attorney, Agent, or Firm* — Slater Matsil, LLP

(57) ABSTRACT

A multi-layer capacitor has dielectric layers and electrode layers arranged therebetween. The multi-layer capacitor has a number of segments that are connected to one another. At least one relief region is provided between the segments. The invention furthermore provides a method for producing such a multi-layer capacitor.

18 Claims, 2 Drawing Sheets

(51) Int. Cl.
*B32B 7/04* (2006.01)
*B32B 15/04* (2006.01)
*B32B 37/00* (2006.01)
*B32B 37/18* (2006.01)
*H01G 4/005* (2006.01)
*H01G 4/12* (2006.01)

(52) U.S. Cl.
CPC ....... *B32B 2311/14* (2013.01); *B32B 2311/18* (2013.01); *B32B 2457/16* (2013.01); *H01G 4/1245* (2013.01)

(56) References Cited

U.S. PATENT DOCUMENTS

| | | |
|---|---|---|
| 5,621,607 A | 4/1997 | Farahmandi et al. |
| 5,835,338 A | 11/1998 | Suzuki et al. |
| 6,282,079 B1 * | 8/2001 | Nagakari .............. H01G 4/232 361/303 |
| 7,675,732 B2 | 3/2010 | Aoki |
| 7,859,821 B2 | 12/2010 | Shimizu |
| 2006/0238073 A1 | 10/2006 | Ragossnig et al. |
| 2010/0097739 A1 | 4/2010 | Prymak |
| 2010/0140379 A1 | 6/2010 | Suzuki et al. |
| 2012/0281335 A1 | 11/2012 | Engel et al. |

FOREIGN PATENT DOCUMENTS

| | | |
|---|---|---|
| CN | 101868838 A | 10/2010 |
| DE | 19709690 A1 | 9/1998 |
| JP | S6076028 U | 5/1985 |
| JP | 7240338 | 9/1995 |
| JP | H07240337 A | 9/1995 |
| JP | 9180956 A | 7/1997 |
| JP | 2007149780 A | 6/2007 |
| JP | 201010157 A | 1/2010 |

* cited by examiner

MULTI-LAYER CAPACITOR AND METHOD FOR PRODUCING A MULTI-LAYER CAPACITOR

This patent application is a national phase filing under section 371 of PCT/EP2013/070820, filed Oct. 7, 2013, which claims the priority of German patent application 10 2012 111 023.9, filed Nov. 15, 2012, each of which is incorporated herein by reference in its entirety.

TECHNICAL FIELD

Embodiments of the present invention relate to a multi-layer capacitor and a method for producing a multi-layer capacitor.

BACKGROUND

U.S. Pat. No. 5,621,607 discloses capacitors with a multi-layer structure that, for example, are composed of a plurality of electrode layers between which a dielectric is respectively arranged. The capacitor with multi-layer structure thereby comprises a multiple of the capacitance that attaches to an individual capacitor element composed of two electrode layers with dielectric arranged therebetween.

SUMMARY

The invention provides a multi-layer capacitor, in particular a ceramic multi-layer capacitor. The capacitor is used as an intermediate circuit capacitor, for example. In particular, the capacitor can be used with fast semiconductors in inverters.

It is an object to specify a multi-layer capacitor and a method for producing a multi-layer capacitor having improved properties.

The invention provides a multi-layer capacitor, which has dielectric layers and electrode layers arranged therebetween. The multi-layer capacitor has a plurality of segments which are connected to one another, wherein at least one relief region is arranged between the segments. The connection between the segments is preferably weakened or interrupted in the relief region.

The multi-layer capacitor preferably has a monolithic form. In particular, the multi-layer capacitor has a monolithic main body. The main body comprises the dielectric layers and electrode layers. The dielectric layers and electrode layers are preferably sintered together. In particular, the segments can be sintered together.

It is preferably the case that mechanical stresses are kept low in the multi-layer capacitor by the relief region. In this case, the thickness of the segments is preferably so small that mechanical stresses in the segments do not lead to the formation of cracks in the capacitor. Through the weakening or interruption of the connection between the segments, the mechanical stresses cannot accumulate in such a manner that cracks form in the capacitor.

The dielectric layers of the multi-layer capacitor are preferably ceramic layers. The dielectric layers can have a piezoelectric or electrostrictive behavior when a voltage is applied to the capacitor, and therefore elongation of the dielectric layers arises. Particularly in the event of an inhomogeneous elongation of the dielectric layers, mechanical stresses can arise in the capacitor. On account of the relief regions, it is also possible to use materials having high elongation values for a monolithic multi-layer capacitor having a high capacitance value. In particular, the multi-layer capacitor can have a large thickness, without critical mechanical stresses arising. It is therefore possible for a multi-layer capacitor to be formed which is not limited in thickness and thus also in its capacitance value.

In one embodiment, the dielectric layers comprise an anti-ferroelectric material. By way of example, the dielectric layers comprise lead lanthanum zirconium titanate (PLZT). In an alternative embodiment, the dielectric layers comprise a ferroelectric material, for example, a ferroelectric ceramic based on barium titanate.

The multi-layer capacitor preferably has at least one external contacts for contact-connecting at least one electrode layer. By way of example, the multi-layer capacitor has two external contacts for contact-connecting at least a first and a second electrode layer. The external contacts can be arranged on opposing outer sides of the main body.

By way of example, the first and second electrode layers do not overlap. A first and second electrode layer can be arranged in a common plane.

The multi-layer capacitor preferably has at least a third electrode layer, which is not contact-connected by any of the external contacts. An electrode of this type is also referred to as a "floating" electrode. The third electrode layer can overlap with the first and/or the second electrode layer. The third electrode layer preferably overlaps with the first and the second electrode layer.

The multi-layer capacitor and in particular each segment of the multi-layer capacitor preferably has a multiplicity of first electrode layers, a multiplicity of second electrode layers and a multiplicity of third electrode layers.

In one embodiment, the capacitor has at least one series connection of two capacitances. In particular, a first capacitance can be formed by the overlap of at least a first electrode layer with at least a third electrode layer and a second capacitance can be formed by the overlap of at least a second electrode layer with at least a third electrode layer.

The relief region is preferably arranged at least partially in an inactive zone of the stack. In an inactive zone of the stack, there is no overlap between an electrode layer and a counterelectrode. Therefore, the inactive zone does not contribute to the capacitance of the multi-layer capacitor.

By way of example, only electrode layers of one type, for example, only first electrode layers, only second electrode layers or only third electrode layers, are present in the inactive zone, as seen in the stacking direction. Alternatively, the inactive zone can also be entirely free of electrode layers. The relief region preferably covers all inactive zones.

In one embodiment, at least one relief region is arranged at least partially in a region of the capacitor in which a third electrode layer overlaps neither with a first nor a second electrode layer. Therefore, only third electrode layers are arranged in this region. By way of example, the relief region is located between two third electrode layers. In addition or as an alternative thereto, at least one relief region can be arranged at least partially in a region in which only first or second electrode layers are arranged. In addition or as an alternative thereto, at least one relief region can be arranged at least partially in a region which is free of electrode layers. In particular, this region is free of electrode layers as seen in the stacking direction.

The relief region can also extend into a region in which electrode layers of differing type overlap, in particular an electrode layer overlaps with a counterelectrode. Regions of this type are referred to as active zones, since they contribute to the capacitance of the capacitor. By way of example, first and third electrode layers overlap in a first active zone and second and third electrode layers overlap in a second active zone. The relief regions preferably extend into the active zone to the extent to which an inhomogeneous elongation arises in the active zone when an electrical voltage is applied. In regions in which there is a homogeneous elongation, the segments are preferably connected to one another firmly, in particular sintered to one another firmly. It is preferable for relief regions to be arranged at least in the regions between two segments in which there is an inhomogeneous elongation of the dielectric layers.

In one embodiment, the relief region is structured. In particular, the relief region can have at least one cutout. By way of example, a connection region in which the segments are connected to one another firmly, in particular sintered to one another firmly, is formed in the cutout.

In one embodiment, the relief region is arranged in a plane parallel to the electrode layers at least in all regions of the main body which adjoin the outer sides. The relief region can surround connection regions which are arranged entirely within the main body and therefore do not reach as far as any of the outer sides.

In one embodiment, at least three relief regions are provided between two segments connected to one another. In particular, the relief regions can lie in a common plane. It is preferable for a relief region to be arranged in each inactive zone. The relief regions can also be connected to one another. A plurality of relief regions arranged in a plane can also be considered to be one single, structured relief region.

In one embodiment, provision is made of at least one relief region which does not adjoin any of the external contacts. By way of example, the relief region is arranged at least partially in an inactive zone which does not adjoin the external contacts. In addition or as an alternative thereto, at least one relief region can adjoin one of the external contacts.

The relief region can be in the form of a gap between the segments. In particular, the dielectric layers of the various segments can be spaced apart from one another in the relief region. The dielectric layers may also bear against one another in the relief region and may be connected to one another not at all or only partially or only with a reduced adhesive strength.

The invention furthermore provides a method for producing such a multi-layer capacitor. In this method, green sheets, in particular ceramic green sheets, are provided for forming the dielectric layers. A paste comprising an organic material is applied to, for example, printed onto, at least one green sheet. A paste for an electrode material is preferably printed onto further green sheets. The paste is preferably applied only at those points at which relief regions are provided. The green sheets are arranged to form a stack, which is sintered. The paste is preferably formed in such a manner that the dielectric layers are prevented completely or partially from sintering together at the points at which the paste is applied, and therefore a relief region is formed here.

BRIEF DESCRIPTION OF THE DRAWINGS

The subjects described here will be explained in more detail hereinbelow on the basis of schematic exemplary embodiments which are not true to scale.

In the drawing.

In the figures which follow, identical reference signs preferably refer to functionally or structurally corresponding parts of the various embodiments.

DETAILED DESCRIPTION OF ILLUSTRATIVE EMBODIMENTS

Figure 1:
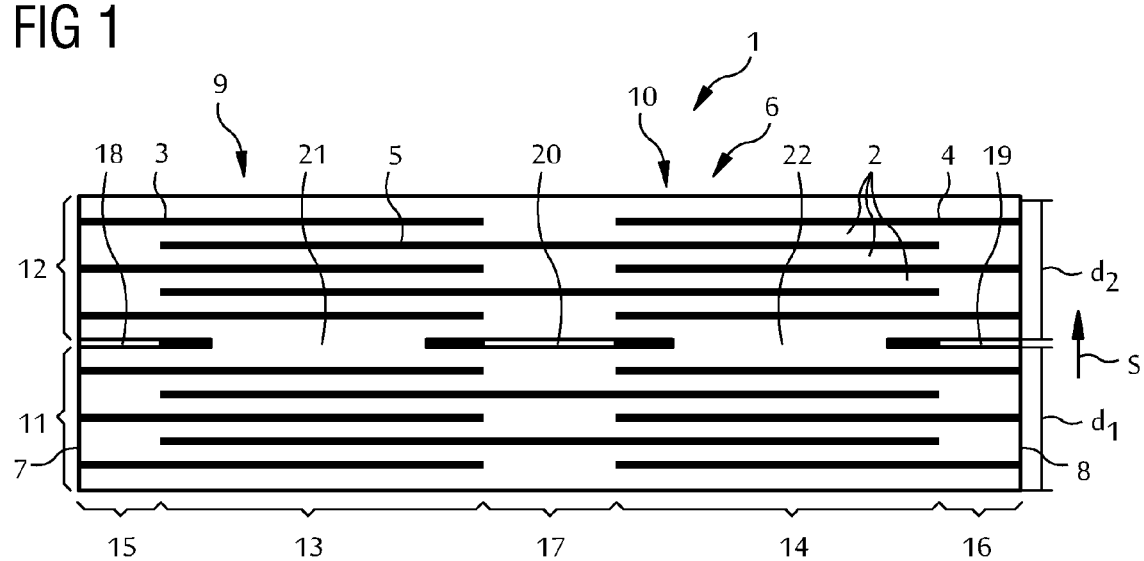
FIG. 1 shows a schematic sectional illustration of a multi-layer capacitor.

FIG. 1 shows a schematic sectional illustration of a multi-layer capacitor 1. The multi-layer capacitor 1 has a main body 6 with dielectric layers 2 stacked one on top of another and electrode layers 3, 4, 5 arranged therebetween. The main body 6 is a monolithic sintered body.

The dielectric layers 2 are preferably in the form of ceramic layers. In particular, the dielectric layers 2 can comprise an anti-ferroelectric material. By way of example, the dielectric layers 2 comprise lead lanthanum zirconium titanate (PLZT). Alternatively, the dielectric layers 2 can also comprise a ferroelectric material, for example, based on barium titanate. The dielectric layers 2 can have a piezoelectric or electrostrictive behavior, and therefore an elongation of the piezoelectric layers 2 arises when a voltage is applied to the multi-layer capacitor 1.

The electrode layers 3, 4, 5 comprise first and second electrode layers 3, 4, which are electrically connected to external contacts (not shown). The external contacts are on a first and, respectively, second outer side 7, 8 of the main body 6. The first and second electrode layers 3, 4 do not overlap as seen in the stacking direction S.

Furthermore, the electrode layers 3, 4, 5 comprise third electrode layers 5, which are not connected to any of the external contacts. The third electrode layers 5 overlap with the first and the second electrode layers 3, 4. A series connection of two capacitances 9, 10 is formed by this arrangement. In the first capacitance 9, the third electrode layers 5 form the counterelectrodes to the first electrode layers 3, and in the second capacitance 10 the third electrode layers 5 form the counterelectrodes to the second electrode layers 4.

The regions of the multi-layer capacitor 1 in which an electrode layer 3, 4 overlaps with a counterelectrode as seen in the stacking direction S are referred to as active zones 13, 14. The regions in which the electrode layers 3, 4 do not overlap with a counterelectrode are referred to as inactive zones 15, 16, 17. A first and a second inactive zone 15, 16 in each case adjoin an outer side 7, 8, on which there is arranged an external contacts. A third inactive zone 17 is arranged between the first and second capacitance 9, 10 and does not adjoin any external contacts.

The multi-layer capacitor 1 has two segments 11, 12 arranged one above another. The segments 11, 12 can have an identical arrangement of electrode layers 3, 4, 5. The topmost electrode layers 3, 4 of the first segment 11 have the same polarity as the bottommost electrode layers 3, 4, lying thereabove, of the second segment 12. No third electrode layers 5 are arranged between the segments 11, 12. Therefore, the region between the segments does not contribute to the capacitance of the multi-layer capacitor 1.

Relief regions 18, 19, 20 are provided between the segments 11, 12. In the relief regions 18, 19, 20, the segments 11, 12 are not connected or are connected only with a reduced adhesive strength. The relief regions 18, 19, 20 are provided in the inactive zones 15, 16, 17 and extend somewhat into the adjoining active zones 13, 14. Furthermore, connection regions 21, 22 are provided between the segments 11, 12 and are arranged between the relief regions

18, 19, 20. In the connection regions 21, 22, the segments 11, 12 are connected to one another firmly, in particular sintered together. In particular, mutually adjoining piezoelectric layers 2 of the segments 11, 12 are connected to one another directly in the connection regions 21, 22.

The formation of the relief regions 18, 19, 20 makes it possible to reduce mechanical stresses in the multi-layer capacitor 1. In dielectric layers 2, which have a piezoelectric elongation in the electric field, stresses of this nature arise in the transition regions between the active zones 13, 14 and the inactive zones 15, 16, 17. In particular, during the application of an electric field in the active zones 13, 14, mechanical tensile stresses can arise in the transition regions. If these mechanical stresses exceed a critical limit, cracks can form in the transition regions and can propagate into the active zones 13, 14 and the inactive zones 15, 16, 17, such that in particular electrodes of differing polarity are connected to the crack. When a high voltage is applied, an electrical breakdown can occur along this crack and can lead to the destruction of the multi-layer capacitor 1.

On account of the relief regions 18, 19, 20, the multi-layer capacitor 1 is divided into the individual segments 11, 12 in such a manner that mechanical stresses remain below the stresses which are critical for the formation of cracks.

In particular, the segments 11, 12 have sufficiently small thicknesses $d_1$, $d_2$ in the stacking direction so that the mechanical stresses do not lead to the formation of cracks. The thicknesses $d_1$, $d_2$ each lie between 1.0 mm and 1.6 mm, for example, e.g. they measure 1.3 mm. In the case of two segments, the overall thickness of the multi-layer capacitor 1 is twice the thickness of an individual segment 11, 12; by way of example, the overall thickness is 2.6 mm.

In further embodiments, it is also possible for more than two segments to be arranged one above another. Relief regions are preferably arranged in each case between the segments. In particular, relief regions can be located at various positions along the stacking direction S.

The relief regions 18, 19, 20 preferably extend into the active zones 13, 14 to the extent to which an inhomogeneous elongation arises in the active zone 13, 14 when an electrical voltage is applied. As a rule of thumb, it holds true here that a relief region 18, 19, 20 extends into the active zone 13, 14 by the width of the inactive zone 15, 16, 17, i.e. the extent of the inactive zone along a straight connection line between the external contacts. In the case in which two capacitances 9, 10 split an inactive zone 17, it is adequate that the relief region 20 extends in each case by half the width of the inactive zone 17 into the adjoining active zones 13, 14.

The relief regions 18, 19, 20 can be in the form of gaps. In the relief regions 18, 19, 20, the segments 11, 12 can be entirely unconnected or can be connected to one another only partially.

To form the relief regions 18, 19, 20, green sheets which comprise a ceramic material and from which the dielectric layers 2 are formed can be printed in certain regions with a paste comprising an organic material. A screen printing method can be used for printing. The paste can be formed entirely from organic material. The paste can also comprise an organic material and a small proportion of ceramic. By way of example, a layer of the paste is applied with a thickness of 0.5 to 10 μm, preferably between 1 and 3 μm. As a result, the ceramic material present in the green sheets is not pressed tightly onto one another during a lamination process with subsequent pressing. In particular, it is possible to prevent the ceramic particles of adjacent green sheets from coming into contact. In a debinding process, the ceramic material is fired out, such that a gap remains between the ceramic particles. In a subsequent sintering process, the ceramic particles are connected here only inadequately or not at all. In particular, the ceramic particles are prevented entirely or partially from sintering together. As a result, a relief region 18, 19, 20 is incorporated in a targeted manner in the sintered component at a certain position.

Figure 2:
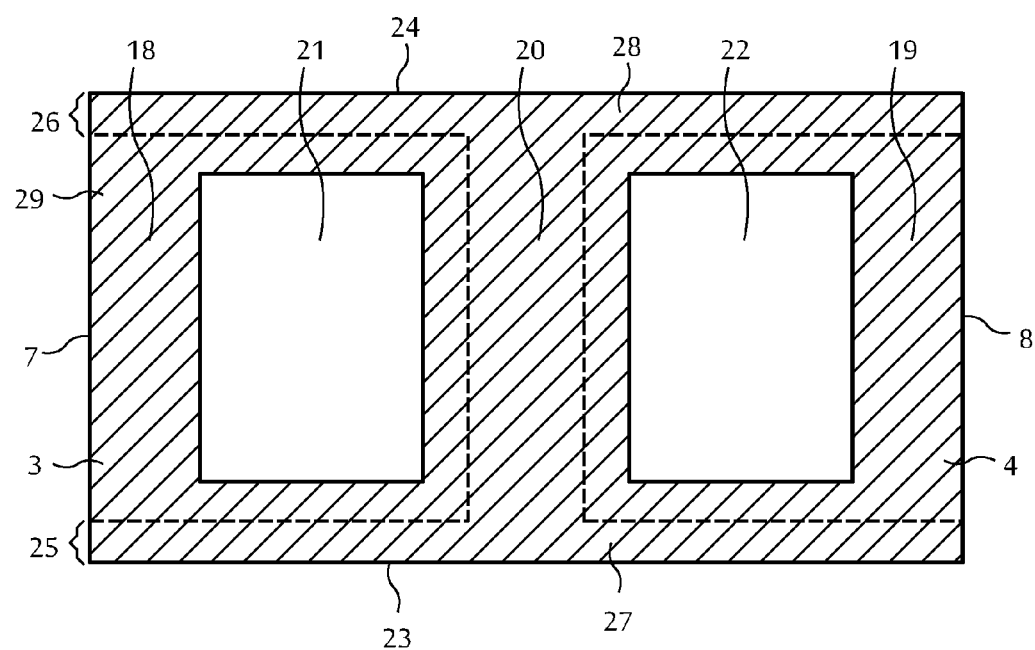
FIG. 2 shows a cross-sectional view of the multi-layer capacitor shown in FIG. 1.

FIG. 2 shows the multi-layer capacitor shown in FIG. 1 in a cross section in the plane of the relief regions 18, 19, 20 and therefore in a plane parallel to the electrode layers 3, 4, 5.

First and second electrode layers 3, 4, which are arranged beneath the sectional plane, are indicated by dashed lines.

The first electrode layer 3 adjoins the first outer side 7 and the second electrode layer 4 adjoins the second outer side 8. Both electrode layers 3, 4 are spaced apart from third and fourth outer sides 23, 24, on which there are arranged no external contacts. Therefore, the multi-layer capacitor 1 has fourth and fifth inactive zones 25, 26, in which no electrode layers are provided as seen in the stacking direction. Fourth and fifth relief regions 27, 28 are arranged in these inactive zones 25, 26 and extend into adjoining active regions. The fourth and fifth relief regions 27, 28 therefore run along the third and fourth outer sides 23, 24. All relief regions 15, 16, 17, 27, 28 are connected to one another.

The relief regions 15, 16, 17, 27, 28 can also be regarded as one single, structured relief region 29, which is illustrated by hatching. The structured relief region 29 is therefore arranged in all inactive zones 15, 16, 17, 25, 26. The connection regions 21, 22 form two cutouts in the structured relief region 29. The structured relief region 29 adjoins all outer sides 7, 8, 23, 24 which run perpendicular to the electrode layers 3, 4. In particular, in the plane of the relief region 29 the structured relief region 29 completely covers all regions of the main body 6 which adjoin the outer sides 7, 8, 23, 24. Provision is therefore not made of any connection region 21, 22 which adjoins one of the outer sides 7, 8, 23, 24. The connection regions 21, 22 are surrounded completely by the structured relief region 29.

Figure 3:
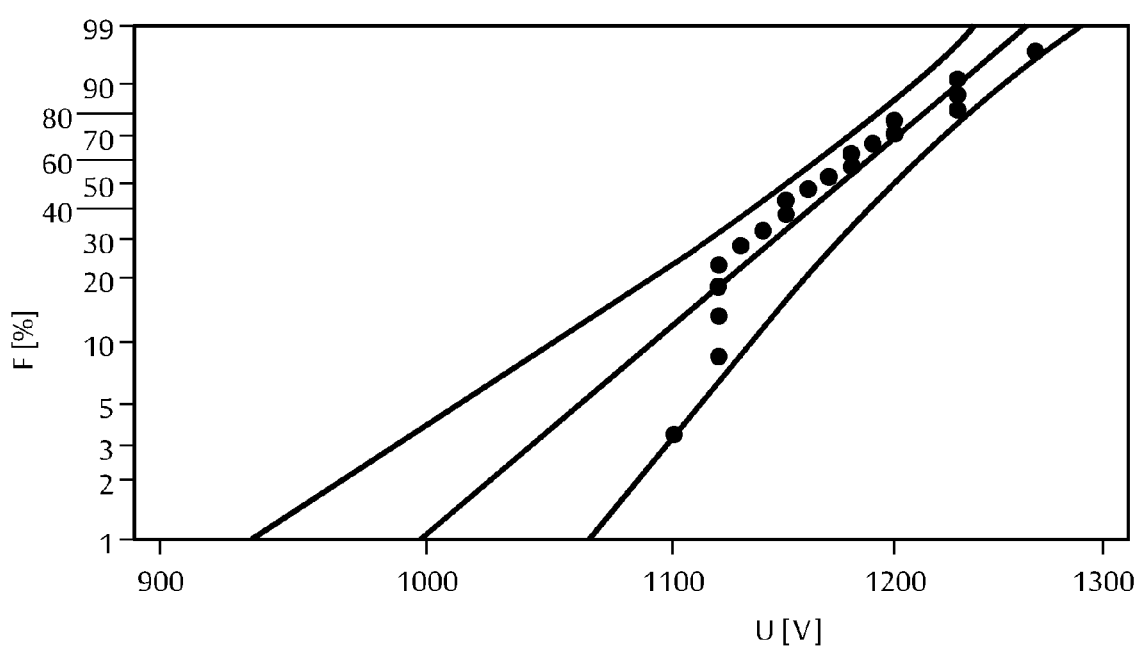
FIG. 3 shows, in a Weibull distribution, breakdown voltages in a multi-layer capacitor having relief regions.

FIG. 3 shows, in a Weibull distribution, breakdown voltages in a multi-layer capacitor 1 as shown in FIG. 1. In particular, the failure frequency F in % is plotted against the applied voltage U in volts. A confidence interval of 95% is selected for the Weibull distribution.

In a multi-layer capacitor having no relief regions 18, 19, 20, 27, 28, the characteristic breakdown voltage would be approximately 750 V (not shown). It can clearly be seen from the distribution that, in the case of a multi-layer capacitor 1 having the relief regions 18, 19, 20, 27, 28, the characteristic breakdown voltage is at considerably higher values.

As a result, the multi-layer capacitor 1 has the required robustness for load-induced or else fault-induced overvoltages particularly in a field of application in which the multi-layer capacitor 1 interacts with fast semiconductors in inverters. The dielectric strength of the semiconductors for operating or intermediate circuit voltages at 400 V is conventionally 600 to 650 volts. Therefore, these are usually switched off in the event of an overload or fault, such that the voltage on the capacitor increases. In an unfavorable case, this can be up to 750 volts, for example, and therefore a breakdown voltage of the capacitor which lies at a considerably higher value is advantageous.

The invention claimed is:
1. A multi-layer capacitor comprising:
a plurality of dielectric layers;
a plurality of electrode layers, wherein the dielectric layers and electrode layers are arranged between each other, the dielectric and electrode layers being arranged so that the multi-layer capacitor comprises a plurality of segments that are connected to one another, wherein at least one connection region is located between the segments, and wherein the segments are strongly connected with each other in the at least one connection region; and a relief region disposed between the segments, wherein the relief region and the at least one connection region are located at the same height relative to a stacking direction of the dielectric and electrode layers, wherein the relief region is at least partially located in an inactive zone and the at least one connection region is at least partially located in an active zone of the multi-layer capacitor, and wherein the segments are not connected to each other or weakly connected to each other in the relief region compared to a connection of the dielectric and electrode layers within the segments.

2. The multi-layer capacitor according to claim 1, further comprising a first external contact and a second external contact, wherein the plurality of electrode layers comprises a first electrode layer that is electrically connected to the first external contact, and wherein the plurality of electrode layers comprises a second electrode layer that is electrically connected to the second external contact.

3. The multi-layer capacitor according to claim 2, wherein the plurality of electrode layers further comprises a third electrode layer that is not contact-connected by any external contact.

4. The multi-layer capacitor according to claim 3, wherein the third electrode layer overlaps with the first electrode layer and the second electrode layer.

5. The multi-layer capacitor according to claim 4, wherein the relief region is arranged at least partially in a region in which the third electrode layer overlaps neither with the first electrode layer nor with the second electrode layer.

6. The multi-layer capacitor according claim 2, wherein the relief region extends at least partially into a region in which the first electrode layer and the second electrode layer overlap.

7. The multi-layer capacitor according to claim 1, wherein three relief regions are disposed between the segments.

8. The multi-layer capacitor according to claim 1, further comprising external contacts for contact-connecting ones of the electrode layers, wherein the relief region does not adjoin any external contact.

9. The multi-layer capacitor according to claim 1, wherein the relief region is arranged in a plane parallel to the electrode layers at least in all regions that adjoin outer edges of the multi-layer capacitor.

10. The multi-layer capacitor according to claim 1, wherein the multi-layer capacitor has a monolithic form.

11. The multi-layer capacitor according to claim 1, wherein the relief region comprises a gap between the segments.

12. The multi-layer capacitor according to claim 1, wherein the dielectric layers comprise an anti-ferroelectric material.

13. The multi-layer capacitor according to claim 12, wherein the dielectric layers comprise lead lanthanum zirconium titanate.

14. The multi-layer capacitor of claim 1, wherein the at least one connection region is located entirely in an interior of a base body formed by the dielectric and electrode layers, such that the at least one connection region does not extend to an outer side of the base body.

15. A method for producing a multi-layer capacitor, the method comprising:

forming a plurality of dielectric layers;

forming a plurality of electrode layers, wherein the dielectric layers and the electrode layers are arranged between each other, the dielectric and electrode layers being arranged so that the multi-layer capacitor comprises a plurality of segments that are connected to one another, wherein at least one connection region is located between the segments, and wherein the segments are strongly connected with each other in the at least one connection region; and forming a relief region disposed between the segments, wherein the relief region and the at least one connection region are located at the same height relative to a stacking direction of the dielectric and electrode layers, wherein the relief region is at least partially located in an inactive zone and the at least one connection region is at least partially located in an active zone of the multi-layer capacitor, and wherein the segments are not connected to each other or weakly connected to each other in the relief region compared to a connection of the dielectric and electrode layers within the segments.

16. The method according to claim 15, wherein forming the dielectric layers and forming the relief region comprise:

providing green sheets for forming the dielectric layers;

applying a paste comprising an organic material to at least one of the green sheets;

arranging the green sheets to form a stack; and sintering the stack.

17. The method according to claim 16, wherein the paste is applied in such a manner that the dielectric layers are prevented from completely or partially sintering together at points at which the paste is applied.

18. The method according to claim 16, wherein forming the electrode layers comprises applying a second paste to other ones of the green sheets.

* * * * *